US008474001B2

(12) United States Patent
Thompson et al.

(10) Patent No.: US 8,474,001 B2
(45) Date of Patent: Jun. 25, 2013

(54) NEAR REAL TIME DELIVERY OF VARIABLE BIT RATE MEDIA STREAMS

(75) Inventors: Bruce Albert Thompson, Saratoga, CA (US); Xiaomei Liu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 938 days.

(21) Appl. No.: 12/368,782

(22) Filed: Feb. 10, 2009

(65) Prior Publication Data
US 2010/0202509 A1    Aug. 12, 2010

(51) Int. Cl.
*H04N 7/173* (2011.01)
(52) U.S. Cl.
USPC .............. 725/131; 725/95; 725/96; 725/134
(58) Field of Classification Search
USPC ...................................... 725/95–96, 131, 134
See application file for complete search history.

(56) References Cited

U.S. PATENT DOCUMENTS

| 6,085,221 | A * | 7/2000 | Graf .............................. 709/202 |
| 6,381,254 | B1 * | 4/2002 | Mori et al. .................... 370/537 |
| 6,980,526 | B2 | 12/2005 | Jang et al. |
| 7,447,791 | B2 * | 11/2008 | Leaning et al. ............... 709/231 |
| 2002/0090029 | A1 * | 7/2002 | Kim ......................... 375/240.03 |
| 2006/0018266 | A1 * | 1/2006 | Seo ................................. 370/252 |
| 2008/0148324 | A1 * | 6/2008 | Joyce et al. ..................... 725/94 |
| 2009/0285282 | A1 * | 11/2009 | Amir et al. ............... 375/240.02 |
| 2010/0027417 | A1 * | 2/2010 | Franceschini et al. ........ 370/232 |

* cited by examiner

*Primary Examiner* — Chris Parry
*Assistant Examiner* — Gigi L Dubasky
(74) *Attorney, Agent, or Firm* — Edell, Shapiro & Finnan, LLC (57) ABSTRACT

A method of delivering a variable bit rate (VBR) media stream in near real time includes identifying a selected media asset to be streamed to a media receiver, receiving an available access bandwidth at which the media receiver can receive data, and initiating a session setup for delivery of the selected media asset. The method further includes calculating a delay in decoding a media stream associated with the selected media asset at the media receiver based on the available access bandwidth, and a calculated required minimum transmission rate of a VBR media stream representative of the selected media asset. The method further includes transmitting the selected media asset at the required minimum transmission rate of the VBR media stream and providing the calculated delay to the media receiver such that the media receiver begins decoding the media stream in accordance with the calculated delay.

17 Claims, 5 Drawing Sheets

NEAR REAL TIME DELIVERY OF VARIABLE BIT RATE MEDIA STREAMS

BACKGROUND

With advances in computer networking combined with the development of powerful home computers and modern operating systems, the ability to provide streaming media has become more viable and in turn the demand for such streaming media has significantly increased. As the demand for streaming media increases, the ability to perform near real time delivery of a high quality media asset to a destination media receiver with a limited amount of available access bandwidth has become increasingly important. Known encoding methods (e.g., moving pictures experts group (MPEG) standards) allow media streams to be encoded as either constant bit rate (CBR) or variable bit rate (VBR). The bit rate associated with compressed data normally varies over time since the image complexity and changes between frames fluctuate over time. Encoders configured to generate VBR media streams typically keep video quality constant over time and vary the bit rate while encoders that generate CBR media streams keep bit rate constant and vary the video quality over time. The peak rate of many known VBR encoded media streams is typically 2-3 times higher than that of the average rate.

In known streaming media systems (e.g., internet protocol television (IPTV)) the bandwidth accounting used for admission control must use the peak rate associated with VBR streams in order to ensure that internet protocol (IP) packets associated with the video class do not experience congestion or drop during periods of peak bandwidth usage. When the admission control is performed based on VBR peak rate, the actual bandwidth used with video, for example, is underutilized most of the time. As a result, most known streaming media systems (e.g., IPTV) that utilize encoded VBR media streams (e.g., MPEG) employ rate clamping to reduce the peak rate of each VBR stream. Rate clamping is performed with a trans-rating function (e.g., an MPEG trans-rating function) that is computationally expensive and causes video quality degradation during periods where image complexity or motion is high. In addition, the conversion results in extra data (e.g., padding bits) being added to the media stream when the bandwidth of the original VBR stream is lower than the target CBR rate. Consequently, the average bandwidth of a CBR stream, derived from a VBR stream by performing rate clamping, is typically higher than the average rate of the VBR stream it was derived from. The resulting CBR stream is therefore less efficient (e.g., requires more bits) than the original VBR stream and thus, requires more bandwidth on average to transmit than does the original VBR stream.

DESCRIPTION OF EXAMPLE EMBODIMENTS

Overview

A method of delivering a variable bit rate (VBR) media stream in near real time is described herein. The method includes identifying a selected media asset to be streamed to a media receiver, receiving an available access bandwidth at which the media receiver can receive data, and initiating a session setup for delivery of the selected media asset. The method further comprises calculating a delay in decoding a media stream associated with the selected media asset at the media receiver based on the available access bandwidth, and a calculated required minimum transmission rate of a VBR media stream representative of the selected media asset. The method still further comprises transmitting the selected media asset at the required minimum transmission rate of the VBR media stream and providing the calculated delay to the media receiver such that the media receiver begins decoding the media stream in accordance with the calculated delay.

In another embodiment, a system is configured to deliver and decode in near real time a variable bit rate (VBR) media stream representative of a selected media asset. The system comprises a media asset server and a media receiver including a delay buffer. The media receiver is configured to send an access bandwidth parameter indicating an available access bandwidth of the media receiver and a buffer size parameter indicating a size of the delay buffer to the media asset server and request to commence play of the selected media asset. The media asset server comprises a calculator configured to calculate a delay parameter to be forwarded to the media receiver, the delay parameter indicating the amount to delay decoding of the selected media asset based on the available access bandwidth, the size of the delay buffer, and the rate profile of the selected media asset (e.g., the required minimum transmission rate). After the delay parameter is derived by the media server it will be passed back to the media receiver. In response to receiving the request to commence play, the media asset server is configured to start transmitting the VBR media stream to the media receiver. The media receiver is configured to decode the VBR media stream according to the delay parameter.

Figure 1:
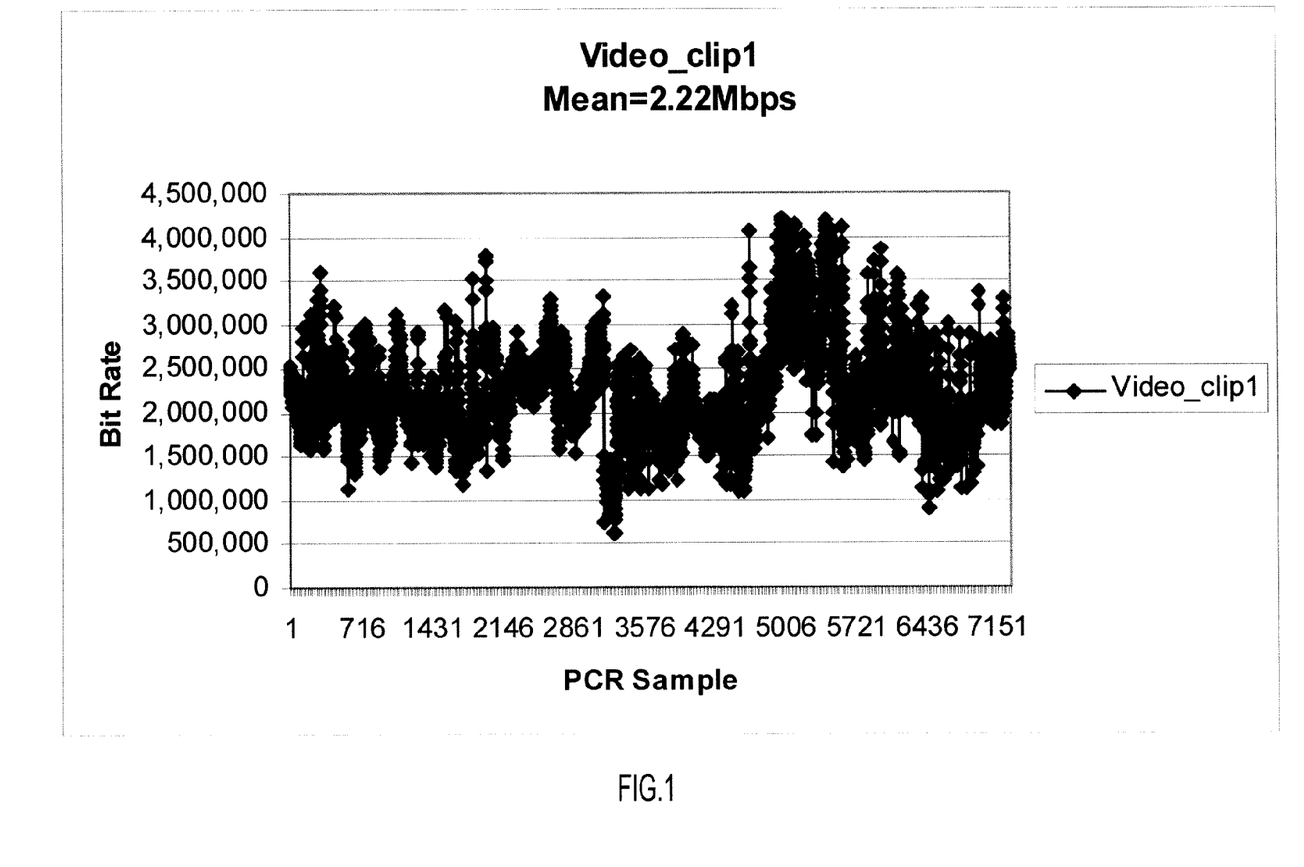
FIG. 1 is a graphical chart that illustrates the instantaneous bandwidth usage for an example variable bit rate (VBR) media stream for a given program clock reference (PCR) sample.

FIG. 1 illustrates the instantaneous bandwidth usage (i.e., bit rate) for an example variable bit rate (VBR) media stream (e.g., an MPEG video clip) for selected program clock reference (PCR) samples. The peaks associated with the VBR media stream can be more smoothly processed, for example, by employing additional buffering at the receiver (e.g., via a delay buffer). This additional buffering is performed at a network level and is separate from the buffering performed at the media stream decoder level (e.g., via an MPEG level decoder buffer). The effective bandwidth savings incurred by the additional buffering (e.g., via a delay buffer) can be determined, for example, by calculating the peak value of a moving average of a video clip's instantaneous bandwidth. The calculated mean value of the example VBR media stream as shown in FIG. 1 is, for example, 2.22 Mbps.

Figure 2:
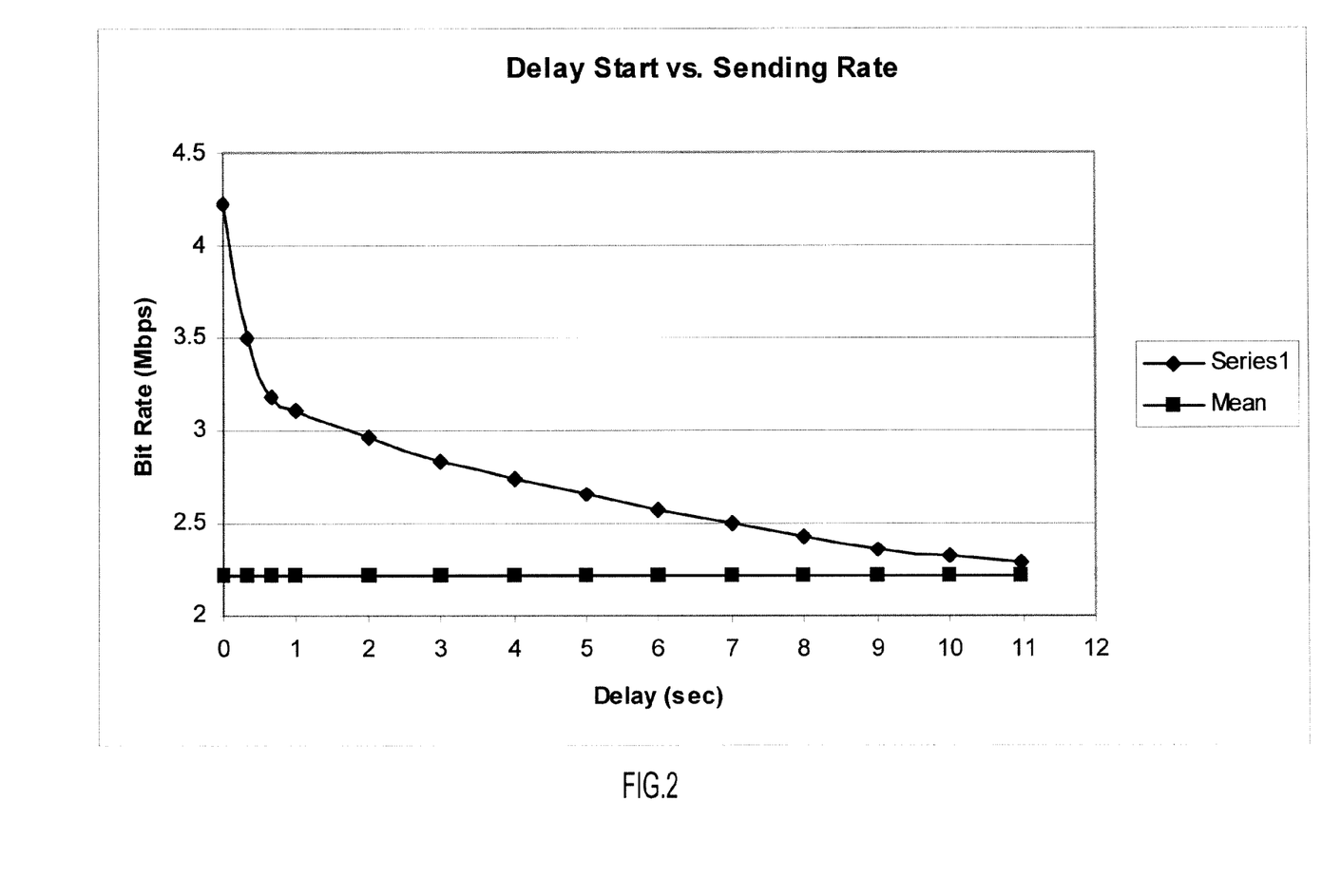
FIG. 2 is a graphical chart that illustrates the relationship between an available bandwidth for delivery of an example media stream versus a start delay for near real time delivery of the media stream according to an embodiment of the present invention.

FIG. 2 illustrates the sending bit rate of the example VBR media stream of FIG. 1 verses a start delay for near real time delivery of the VBR media stream according to an embodiment of the present invention. The bandwidth savings for a particular delay buffer size can be determined, for example, by setting the averaging period equal to the size of the buffer. Since the buffer/moving average period represents stream startup delay, a series of buffer size/average bandwidth calculations can be used to produce a curve showing the trade off between stream startup latency and required delivery bandwidth. More specifically, FIG. 2 shows that as the stream startup latency increases, the required delivery bandwidth decreases. In other words, FIG. 2 shows, for example, that as the stream startup delay increases, an amount of required delivery bandwidth decreases.

Stream startup latency represents the amount of time it takes to change channels in a broadcast service and the amount of time it takes to start or reposition a video on-demand media stream. While a five second channel change time, for example, is likely unacceptable for a broadcast service, a five second latency, for example, associated with starting or repositioning an on-demand media stream (e.g., on-demand video) may be acceptable for users whose access bandwidth is not sufficient to perform true real time streaming using conventional methods of smoothing VBR bandwidth such as CBR rate clamping.

Conventional MPEG encoders and decoders may use buffers to reduce the effective transmission bandwidth for an MPEG media stream, trading off stream startup latency for peak bandwidth usage. However, since conventional MPEG encoders are tuned for broadcast channel latencies, the amount of buffering used in conventional MPEG encoding/decoding systems is typically around 400 msec.

On-demand applications differ from broadcast (e.g., live) applications in that on-demand applications are less sensitive to stream startup latency and latency/bandwidth tradeoffs can be tuned on a per stream basis. On-demand applications also differ from broadcast applications in that, in accordance with embodiments of the present invention, session signaling associated with each on-demand session can be used to negotiate the start latency/bandwidth for each on-demand stream. Furthermore, additional buffering (e.g., via a delay buffer) may be employed to reduce peak bandwidth usage for on-demand applications.

For a variable bit rate (VBR) on-demand media asset (e.g., video on-demand (VOD)), the bit rate varies throughout the asset play time. In theory, the minimum bandwidth required to deliver a VBR on-demand media asset (e.g., video on-demand (VOD)) in a constant bit rate (CBR) pipe is the average bit rate of the VBR media asset instead of the peak rate.

According to an embodiment of the present invention, a delay buffer may be used in connection with a media receiver (e.g., a set top box (STB)). Further, the media receiver may be configured to decode the media stream in accordance with a calculated delay negotiated at stream startup. According to an embodiment of the present invention, in the case that the calculated delay is provided as a delay time, the media receiver does not forward the data of the delay buffer to commence decoding the media stream until the period for the delay time has expired. According to another embodiment of the present invention, in the case that the calculated delay is provided as a threshold level of the delay buffer, the media receiver does not forward the data of the delay buffer to commence decoding the media stream until the threshold level of the delay buffer has been met. Delaying decoding of the media stream effectively provides a buffer to absorb the bit rate variation of the VBR media asset (e.g., VOD). This delay vs. bit rate relationship varies for each asset and can be different depending on the interval over which calculations are made.

Conventional media asset (e.g., VOD) servers use piece-wise constant bit rate (CBR) transmission for the delivery of a VBR media asset. These conventional media asset (e.g., VOD) servers transmit VBR streams by determining the transmission rate of the stream over each program clock reference (PCR) interval (e.g., about 1/30 sec) and shaping the output stream at the rate determined for that interval. The output rate for a given interval can be determined by measuring the number of bits in the output stream that must be transmitted between 2 adjacent PCR time stamps. The instantaneous VBR rate may be calculated by a video analyzer, for example, based on PCR timestamps and the bits between the two adjacent PCR timestamps. CBR delivery of a VBR media asset may be performed, according to an embodiment of the present invention, via additional buffering to smooth out the VBR stream such that a CBR delivery rate less than a peak VBR rate of the media asset can be employed to deliver and decode the media stream in near real time. For example, a receiver configured to apply additional buffering (e.g., by a delay buffer), according to an embodiment of the present invention, may receive and decode in near real time a media stream with a CBR delivery rate less than a peak VBR rate of the media asset, the additional buffering being applied prior to decoding the media stream. According to an embodiment of the present invention, an amount of additional buffering to be applied to the media stream is based on an available access bandwidth of the media receiver and a calculated required minimum transmission rate of a VBR media stream representative of the media asset.

Figure 3:
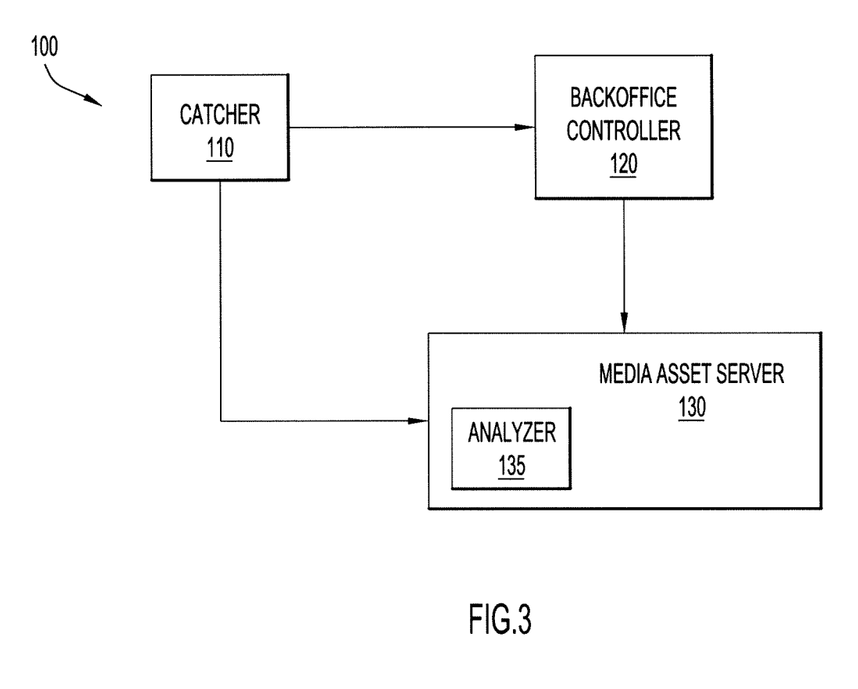
FIG. 3 is a diagrammatic illustration of an example back-office media system for ingesting a media asset according to an embodiment of the present invention.

An example backoffice media system 100 configured to ingest a media asset, according to an embodiment of the present invention, is illustrated in FIG. 3. The backoffice system 100 includes a media catcher 110, a backoffice controller 120, and a media asset server 130. The media catcher 110 can be configured to obtain a media asset and its metadata (e.g., content attributes (e.g., name, size, data type, etc), data structures (e.g., length, fields, columns, etc), data properties (e.g., location, association between portions of data, ownership, etc.), etc.) from a media content provider (e.g., via a satellite path, a hybrid fiber coaxial (HFC) path, a fiber optic path, etc.). The media catcher 110 is further configured to notify the backoffice controller 120 of an available media asset and send respective metadata of the available media asset to the backoffice controller 120. The backoffice controller 120 can be configured to receive the metadata of the available media asset and instruct the media asset server 130 to ingest the media asset from the media catcher 110. The media asset server 130, according to an embodiment of the present invention, is configured to ingest and analyze the media asset. It is to be understood that the media server may perform the analysis of the asset at any time before (e.g., at ingest time) and up to the point that a media session request is made for that asset. The media asset server 130 comprises analyzer 135 configured to analyze the VBR streams and calculate a minimum transmission rate for the media asset with regard to a delay buffer size. Selecting an appropriate transmission rate of the VBR stream with regard to a size of a delay buffer of a destination media receiver prevents underflow in the delay buffer (i.e., a condition where the media receiver attempts to read from an empty buffer). Different media receivers (e.g., STB) may have different sized delay buffers. As such, the calculation may be performed in response to a media receiver requesting download of a media asset (e.g., VOD). According to an embodiment of the invention, the media asset server 130 may be configured to generate a table, for example, including delay vs. bit rate values required to deliver the ingested media asset.

To build a bandwidth vs. delay table, according to an embodiment of the present invention, the media asset server 130 can be configured to inspect the media stream (e.g., MPEG transport stream) and extract PCR values as the time reference for the media stream. The media asset can be separated into segments and the calculation can be performed for each segment. Based on this PCR time reference, the number of bits in the media stream and the delay the minimum transmission rate, according to an embodiment of the present invention, can be calculated as:

(delay+time_passed)*rate>=bits_consumed, where:

time_passed is the PCR time passed since the start of the present segment; and bits_consumed is the number of bits in the media stream since the start of the present segment.

Furthermore, the calculation may be performed for each PCR point and a maximum rate may be chosen as the transmission rate for a given segment. The maximum rate for all of the segments may be selected as the transmission rate for the ingested media asset. According to an embodiment of the present invention, a table can be obtained by repeating the minimum transmission rate calculation for different delay values.

Figure 4:
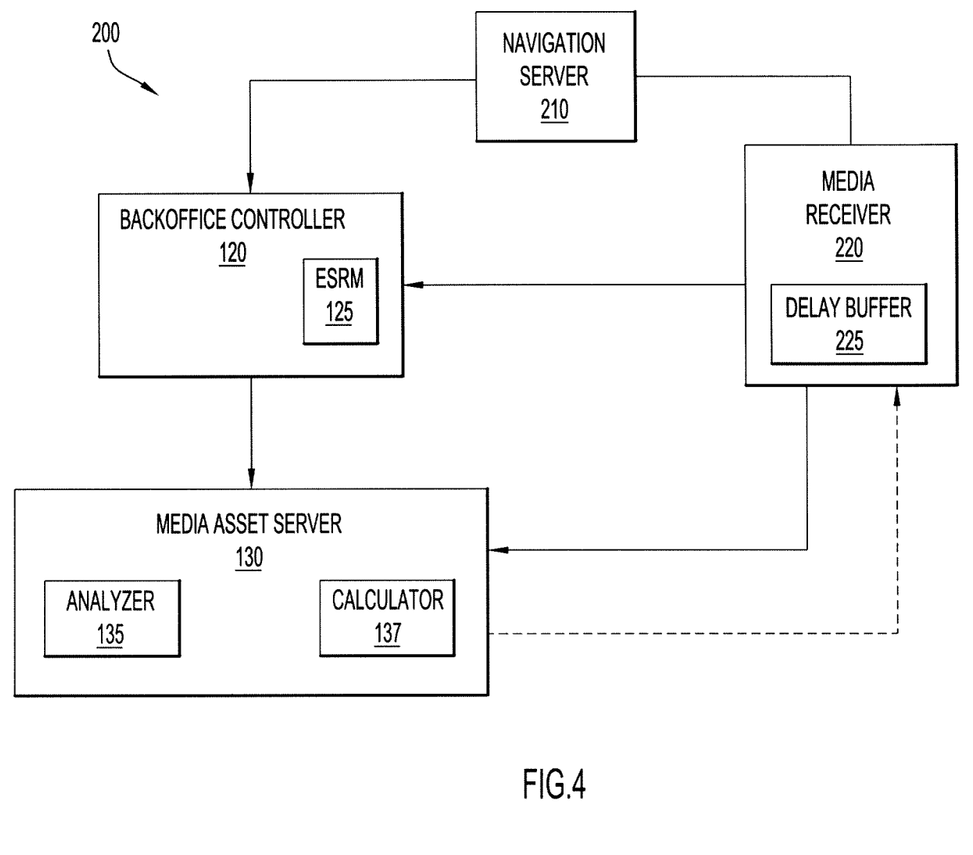
FIG. 4 is a diagrammatic illustration of an example network topology for delivering a media asset via a variable bit rate (VBR) media stream according to an embodiment of the present invention.

An example system 200 configured to deliver a media asset via a variable bit rate (VBR) media stream, according to an embodiment of the present invention, is illustrated in FIG. 4. System 200 comprises backoffice controller 120 and media asset server 130 of FIG. 3. System 200 further comprises navigation server 210 and media receiver 220 including delay buffer 225. Media receiver 220, according to an embodiment of the present invention, is configured to discover a media asset server, determine which assets are available for streaming on the media server, select an asset on a media asset server to be streamed, and request the media asset server to stream the selected asset. Navigation server 210 can be configured to receive catalog information (e.g., names of media assets available for download, metadata of available media assets, etc.) from backoffice controller 120 and media receiver 220 can be configured, for example, to select a media asset from a list of assets catalogued on navigation server 210. The backoffice controller may further comprise an embedded session resource manager (ESRM) 125. ESRM 125 is configured to receive a request from the media receiver to stream a selected media asset, and in response to receiving the request, ESRM 125 is further configured to allocate resources for an on-demand session and establish a session between media asset server 130 and media receiver 220 to implement the streaming of the selected media asset to media receiver 220. The ESRM may be further configured to send an address (e.g., IP address) of the media asset server to the media receiver to allow session control. Media receiver 220 may be further configured to contact media asset server 130 and request to start play of the selected media asset. According to an embodiment of the present invention, media receiver 220 is further configured to send a buffer size parameter indicating a size of delay buffer 225 to media asset server 130. Media receiver 220, according to an embodiment of the present invention, is further configured to send an access bandwidth parameter indicating an available access bandwidth of media receiver 220 to media asset server 130. Media asset server 130 further comprises calculator 137 configured to calculate a delay parameter indicating the amount to delay decoding of the selected media asset based on the available access bandwidth, the size of the delay buffer, and the required minimum transmission rate of the selected media asset. Media asset server 130 is further configured to communicate the delay parameter to media receiver 220. In response to receiving the request to start play, media asset server 130 is configured to start streaming the selected media asset to media receiver 220.

According to an embodiment of the present invention, in system 200 of FIG. 4, the client (i.e., media receiver 220) and server (i.e., media asset server 130) can negotiate the stream startup latency/bandwidth trade off for each on-demand session. In other words, according to an embodiment of the present invention, for near real time delivery of a VBR media stream of a selected media asset, the stream startup delay may be calculated based on the available access bandwidth of the client and on a calculated minimum transmission rate of the selected media asset. Since the amount of bandwidth available for data download to a user (e.g., via digital subscriber line (DSL), hybrid fiber coaxial (HFC), wireless, etc.) fluctuates over time, the client and server can negotiate a different latency/bandwidth for each on-demand session to take advantage of available bandwidth changes to the user.

According to an embodiment of the present invention, the latency/bandwidth trade off can be renegotiated at points other than stream startup time as well. For example, any stream control operation (e.g., fast forward, rewind, pause, etc.) that results in a change in the current play point of the media asset can result in another latency/bandwidth negotiation between the client and server. In addition, the trade off between latency and available bandwidth, according to an embodiment of the present invention, can be pre-calculated by on-demand media asset servers (e.g., a VOD server) and a dynamic negotiation of the latency/bandwidth trade off between an on-demand client (e.g., STB) and a media asset server can be performed at stream start up time.

Premium content is typically delivered in low bandwidth environments by requiring that the entire selected media asset (e.g., video file) is delivered before the subscriber can play the selected media asset. However, near real time delivery of such premium content can be provided, according to an embodiment of the present invention, even in these low bandwidth environments. The startup latency/bandwidth negotiation, according to an embodiment of the present invention, allows for premium content to be delivered at a guaranteed quality level in environments where a service provider can guarantee a minimum amount of access bandwidth over the streaming period of a selected media asset. To maintain a minimum level of quality during session time of a selected media asset, there is an assumption that the available access bandwidth negotiated at stream startup time can be guaranteed by the network. To provide guaranteed bandwidth, the network is preferably able to support a minimum scheduling rate for video packets on shared links and implement an admission control mechanism to ensure that links are not congested with video packets.

In networks that are not quality of service (QoS) enabled for video, the amount of bandwidth available to reserve between a media asset server (e.g., VOD server) and a media receiver (e.g., a subscriber STB) will change over time. Media asset servers (e.g., VOD servers) can provide near real time delivery of selected media assets (e.g., On-demand Video), according to an embodiment of the present invention, in environments where the access network does not allow real time streaming using a low latency stream startup period. In other words, according to an embodiment of the present invention, delivery of premium content at a guaranteed quality level is possible in environments where a service provider can guarantee a minimum amount of delivery bandwidth over the streaming period of a media asset (e.g., video). For example, many broadband access network technologies (e.g., asymmetric digital subscriber line (ADSL)) over long copper loops do not provide enough bandwidth to be able to stream high quality on-demand content in real time. Thus, a service provider, according to an embodiment of the present invention, by forcing a slight (calculated) delay prior to decode operation commencement, may provide near real time delivery of high quality content (e.g., video) to access loops with limited bandwidth (e.g., asymmetric digital subscriber line (ADSL)) that previously could not be used for real time on-demand services (e.g., streaming video, H.320 videoconferencing, etc.).

Furthermore, since the available access bandwidth may be different for each subscriber (e.g., DSL performance/bandwidth is based on the media receiver location) different delay amounts can be communicated to respective downstream media receivers 220. That is, the media asset server (e.g., VOD server) can calculate the minimum delay required based on an actual available access bandwidth budget of an individual media receiver 220, and can pass the delay information back to that media receiver 220 (e.g., STB).

Calculating the delay may further be dependent on content of the selected media asset. For example, content that starts with long bursts (e.g., bursts coinciding with motion rich scenes) require longer delays. For content that starts with a lower bit rate, it is possible to start decoding of the media stream without additional delay. Furthermore, any underrun bit savings accounted for in the beginning of the media stream may compensate for later peaks (e.g., long burst coinciding with motion rich scenes) in the content of the selected media asset. According to an embodiment of the present invention, the delay selection may be adapted, for example, to the available access bandwidth (e.g., of DSL) and content such that the least amount of latency is introduced.

In accordance with other embodiments of the present invention, trick mode play may be implemented by selecting a trick file on the fly during play time such that the trick play is within the transmission channel bandwidth limitation. Trick play files corresponding to different trick play modes (e.g., +2×, −2×, +4×, −4×, etc.) may be pre-generated. The pre-generated trick play files work in a one bandwidth environment (e.g., CBR VOD) such that only a single file is needed for a certain trick play mode. According to an embodiment of the present invention, multiple copies of trick play files can be pre-generated for the same trick play mode, one for each different bandwidth requirement. During a trick play request, the appropriate trick file can be selected which meets the bandwidth and the play speed requirement. Alternatively, the pre-generated trick play file can be based on the worst case transmission channel bandwidth. For example, if the worst case bandwidth to support near real time delivery of a media stream (e.g., VOD) is 1 Mbps, then the trick play files could be generated such that the bandwidth of the trick play will be 1 Mbps or less. Therefore, multiple copies of trick play files for the same play speed but for different transmission bandwidths are not necessary. Generating a trick file according to the minimum speed may reduce the trick play video quality. However, a reduced video quality for trick play may be acceptable whereas for normal play it would not be acceptable. In addition, trick play quality may be enhanced by algorithms typically employed by a media receiver (e.g., STB) to smooth out the playback of trick play content.

In the case of an on-demand playlist (e.g., including an advertisement asset), the worst case scenario of all the assets in the playlist is preferably considered in selecting the delay versus bandwidth. However, it is also possible to further segment an asset into multiple segments and, according to an embodiment of the present invention, the delay calculation may be performed for each segment. For trick play modes, media asset server 130 (e.g., VOD server), according to an embodiment of the present invention, can enforce the trick play bit rates to limit the peak of trick play to the bandwidth limitation.

Figure 5:
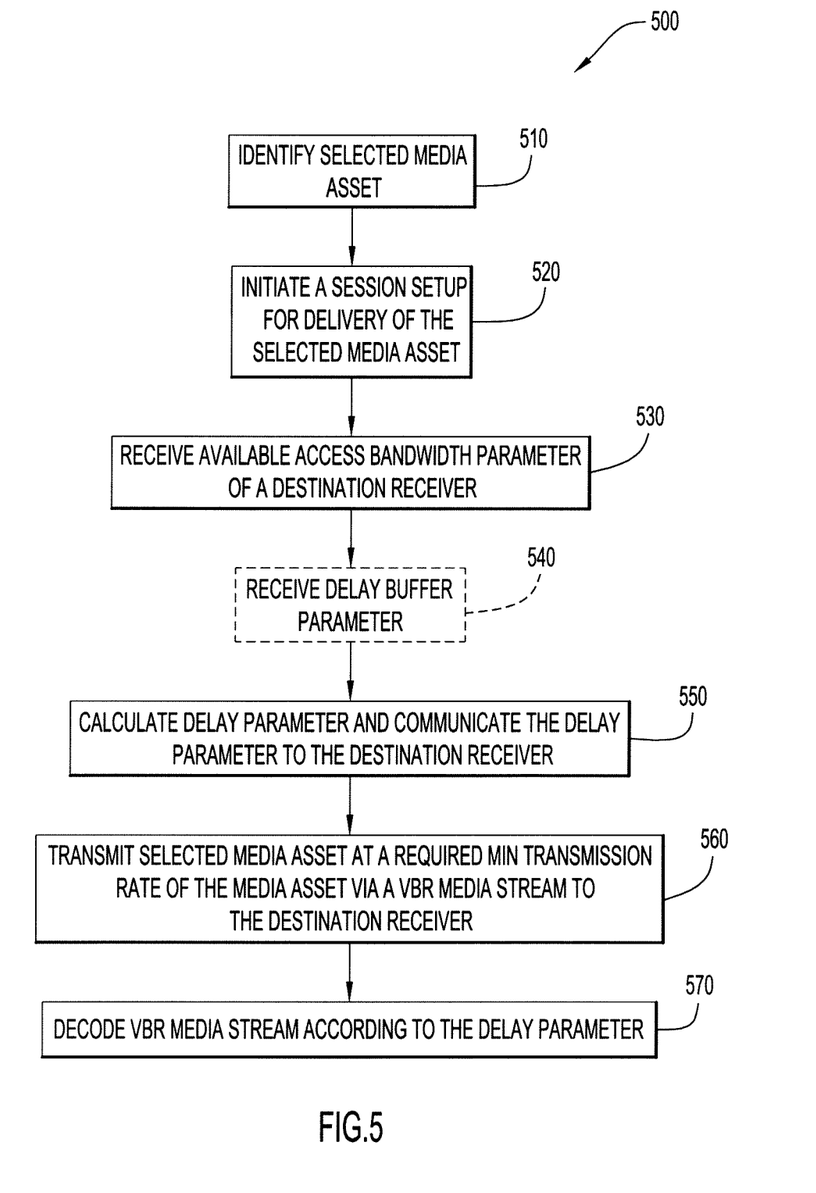
FIG. 5 is a flow diagram illustrating near real time delivery of variable bit rate (VBR) media stream through the network of FIG. 4 according to an embodiment of the present invention.

The manner in which near real time delivery of a variable bit rate (VBR) media stream is performed (e.g., by system 200 of FIG. 4), in accordance with an embodiment of the present invention, is illustrated in FIG. 5. Initially, as described above with regard to FIG. 3, a media asset is ingested into a server (e.g., media asset server 130) and a required minimum transmission rate of the ingested media asset vs. a delay is calculated (e.g., by analyzer 135) and the media asset is available to be delivered in near real time as a VBR media stream to a destination receiver (e.g., media receiver 220). In particular, as illustrated in FIG. 5, a selected media asset is identified at step 510 (e.g., by a navigation server 210). A session setup for delivery of the selected media asset is initiated at step 520. The session setup may be initiated via ESRM 125, for example, or alternatively, may be initiated by the client (e.g., media receiver 220), for example, by sending a request to the server after an asset has been selected. An available access bandwidth parameter of a destination receiver is received at step 530 (e.g., by media asset server 130). Optionally, a delay buffer parameter indicating a size of a buffer (e.g., delay buffer 225) of a destination receiver (e.g., media receiver 220) is received at step 540 (e.g., by media asset server 130). A delay parameter is calculated (e.g., by calculator 137) and communicated to the destined receiver at step 550, the delay parameter being based on the available bandwidth and optional delay buffer parameters. The delay parameter may be provided as a period of time, or alternatively, the delay parameter may be provided as a threshold level of the buffer (e.g., delay buffer 225). The selected media asset is transmitted at the required minimum transmission rate of the media asset via a network channel to a destination receiver (e.g., media receiver 220) at step 560. The VBR media stream is decoded according to the calculated delay parameter (e.g., by media receiver 220) at step 570.

It will be appreciated that the embodiments described above and illustrated in the drawings represent only a few of the many ways of implementing near real time delivery of variable bit rate media streams.

The network providing near real time delivery of a variable bit rate media stream according to the present invention may include any quantity of any conventional or other components including media stream delivering devices (e.g., backoffice control device, media asset server device, navigation server device, media asset receiver device, etc.) and may deliver the media stream employing any suitable protocol and over any suitable energy form (e.g., optical signals, microwave, radio signals, etc.).

The media stream delivering devices (e.g., media asset server device, media asset receiver device, etc.) of the present invention may be implemented by any conventional or other microprocessor, controller or circuitry to perform the functions described herein, while any quantity of processors or processing devices or circuitry may be employed within one or more of the media stream delivering devices, where the media stream delivery functions may be distributed in any fashion among any quantity of hardware or software modules, processors or other processing devices or circuits. The software for the media stream delivering devices may be implemented in any suitable computer language, and could be developed by one of ordinary skill in the computer and/or programming arts based on the functional description contained herein and the flow chart illustrated in the drawings. The techniques described above and illustrated in the flow chart may be modified in any manner that accomplishes the functions described herein.

The media stream delivering device components (e.g., delay buffer, analyzer, calculator, etc.) of the present invention may be implemented by any quantity of any conventional or other components performing the functions described herein. These components may be implemented in hardware and/or software by any processors and/or circuitry. Alternatively, the media stream delivering devices may include software and/or hardware modules to implement any individual function or any combinations of these functions. The present invention may reside as an external module disposed at any suitable location and coupled to components of the media stream delivering device or may be integrated with any desired media stream processing device components.

The software or logic of the present invention embodiments may be available on tangible media (e.g., magnetic or optical mediums, magneto-optic mediums, floppy diskettes, CD-ROM, DVD, memory devices, etc.), and/or may be downloaded (e.g., in the form of carrier waves, packets, etc.) to systems via a network or other communications medium.

The present invention may employ near real time delivery of any desired media stream (e.g., audio, video, etc.) in any communication system and may utilize any desired encoding format or transmission protocol (e.g., MPEG-2, RTP, etc.).

It is to be understood that the present invention is not limited to the applications described herein, but may be utilized for various applications (e.g., on-demand or live streaming media (e.g., streaming audio, streaming video), etc.). Further, the present invention may be used in any data communication system in which identification of any content (e.g., media, data, etc.) is desired.

From the foregoing description, it will be appreciated that the invention makes available a novel communication system and method for near real time delivery of a media stream.

Although the method, and system are illustrated and described herein as embodied in one or more specific examples, it is nevertheless not intended to be limited to the details shown, since various modifications and structural changes may be made therein without departing from the scope of the method, and system and within the scope and range of equivalents of the claims. Accordingly, it is appropriate that the appended claims be construed broadly and in a manner consistent with the scope of the method, and system, as set forth in the following claims.

What is claimed is:

1. A method, comprising:
   identifying a selected media asset to be streamed to a media receiver;
   conducting a first negotiation with the media receiver including (i) initiating a session setup for delivery of the selected media asset, wherein the initiating comprises receiving a bandwidth parameter indicating an available access bandwidth at which the media receiver can receive data and (ii) calculating a delay in decoding a media stream associated with the selected media asset at the media receiver based on the received available access bandwidth of the media receiver, and further based on a calculated required minimum transmission rate of a variable bit rate (VBR) media stream representative of the selected media asset;
   transmitting the selected media asset at the calculated required minimum transmission rate of the VBR media stream and providing the calculated delay to the media receiver such that the media receiver begins decoding the VBR media stream in accordance with the calculated delay,
   wherein:
   a segment transmission rate vs. delay of an asset is calculated, where:

rate≧bits_consumed/(delay+time_passed), wherein:

the time_passed is a program clock reference (PCR) time passed since a start of the segment;
   the bits_consumed is a number of bits in the media stream since the start of the segment;
   the segment transmission rate calculation is performed for each program clock reference (PCR) point in the VBR media stream and a maximum rate is chosen for the respective segment;
   the required minimum transmission rate of the VBR media stream is calculated based on one of the calculated segment transmission rate values;
   detecting a stream control operation that changes a current play point of the media asset to a new play point;
   in response to detecting the stream control operation conducting a second negotiation with the media receiver comprising the same operations as the first negotiation; and
   transmitting the selected media asset from the new play point at a new required minimum transmission rate of the VBR media stream and providing a new calculated delay to the media receiver such that the media receiver begins decoding the VBR media stream at the new play point in accordance with the new calculated delay.

2. The method of claim 1, wherein:
   the initiating of the session further comprises receiving a delay parameter indicating a size of a delay buffer of the media receiver; and
   the calculating of the delay is further based on the size of the delay parameter.

3. The method of claim 2, wherein the delay is provided as a threshold level of the delay buffer.

4. The method of claim 1, wherein the delay is provided as a period of time.

5. The method of claim 1, wherein the initiating of the session further comprises:
   allocating resources for the session to deliver the selected media asset;
   setting up the session between a media asset server and the media receiver; and
   providing the media asset server address to the media receiver.

6. The method of claim 1, wherein a maximum rate value for all segment rate values is chosen as the required minimum transmission rate for the selected asset.

7. A method, comprising:
   selecting a media asset to be streamed to a media receiver;
   performing a first negotiation with a media asset server configured to stream the media asset including (i) sending an available bandwidth parameter indicating a bandwidth at which data of a media stream associated with the media asset can be received by the media receiver and (ii) receiving a delay parameter indicating an amount by which decoding of the media stream is to be delayed by the media receiver, the delay parameter being calculated based on the available bandwidth parameter of the media receiver and a required minimum transmission rate of the media asset;

receiving the media asset via a variable bit rate (VBR) media stream;

decoding the VBR media stream in accordance with the received delay parameter, wherein the required minimum transmission rate of the VBR media stream is calculated based on segment transmission rate values of segments of the selected asset, where:

$rate \geq bits\_consumed/(delay+time\_passed)$, wherein:

the time_passed is a program clock reference (PCR) timed passed since a start of the segment;

the bits_consumed is a number of bits in the stream since the start of the segment; and the segment transmission rate calculation is performed for each program clock reference (PCR) point in the VBR media stream and a maximum rate is chosen for the respective segment;

detecting a stream control operation that changes a current play point of the media asset to a new play point;

in response to detecting the stream control operation performing a second negotiation with the media asset server comprising the same operations as the first negotiation; and thereafter receiving the selected media asset from the new play point at a new required minimum transmission rate of the VBR media stream and receiving a new calculated delay parameter according to which to begin decoding the VBR media stream at the new play point.

8. The method of claim 7, further comprising:
sending a size parameter indicating a size of a delay buffer of the media receiver, wherein the delay parameter is further calculated based on the size parameter.

9. The method of claim 8, wherein the delay parameter indicates a threshold level of the delay buffer.

10. The method of claim 7, wherein the delay parameter indicates a period of time.

11. The method of claim 7, wherein a maximum rate value for all segment rate values is chosen as the required minimum transmission rate for the selected asset.

12. A system, comprising:
a media receiver and a media asset server;
the media receiver capable of discovering a media asset server, determining which assets are available for streaming on the media server, selecting an asset on the media asset server to be streamed, and requesting the media asset server to stream the selected asset; and
the media asset server configured to transmit the selected media asset via a variable bit rate (VBR) media stream representative of the selected media asset at a calculated required minimum transmission rate and provide a calculated delay parameter to the media receiver such that the media receiver begins decoding the VBR media stream in accordance with the calculated delay parameter, wherein the calculated required minimum transmission rate and the calculated delay parameter are calculated during a first negotiation between the media receiver and the media asset server wherein:
the media asset server is further configured to calculate segment transmission rate values, where:

$rate \geq bits\_consumed/(delay+time\_passed)$, wherein:

the time_passed is a program clock reference (PCR) time passed since a start of the segment;

the bits_consumed is a number of bits in the VBR media stream since the start of the segment;

the segment transmission rate calculation is performed for each program clock reference (PCR) point in the VBR media stream and a maximum rate is chosen for the respective segment; and the required minimum transmission rate of the VBR media stream is calculated based on one of the calculated segment transmission rate values; and wherein the media asset server is further configured to detect a stream control operation that changes a current play point of the VBR media stream to a new play point and, in response, perform a second negotiation with the media receiver to obtain a new calculated required minimum transmission rate and a new calculated delay parameter; and thereafter transmit the VBR media stream from the new play point at the new calculated required minimum transmission rate and the new calculated delay parameter such that the media receiver begins decoding the VBR media stream at the new play point in accordance with the new calculated delay parameter.

13. The system of claim 12, wherein the delay parameter is calculated based on an available access bandwidth of the media receiver and the calculated required minimum transmission rate.

14. The system of claim 13, wherein the delay parameter is further calculated based on a size of a delay buffer of the media receiver, the delay parameter being a threshold level of the delay buffer.

15. The system of claim 12, wherein the delay parameter is a period of time.

16. The system of claim 12, wherein the media asset server is configured to select a maximum rate value for all segment rate values as the required minimum transmission rate for the selected asset.

17. The system of claim 12, further comprising:
a media navigation server including a media catalog, the media navigation server being configured to receive a request to download a media asset selected from the catalog and identify the media asset to be download to a media receiver; and
a media backoffice system configured to communicate media catalog information to the navigation server and calculate the delay parameter, the media backoffice system comprising:
an embedded session resource manager (ESRM) configured to initiate setup and allocate media resources to setup a media session for delivery of the selected media asset.

* * * * *